(12) United States Patent
Nagy

(10) Patent No.: US 10,047,668 B2
(45) Date of Patent: Aug. 14, 2018

(54) COMBUSTION ENGINE WITHOUT COMPRESSION AND METHOD

(71) Applicant: Imre Nagy, Budapest (HU)

(72) Inventor: Imre Nagy, Budapest (HU)

( * ) Notice: Subject to any disclaimer, the term of this patent is extended or adjusted under 35 U.S.C. 154(b) by 35 days.

(21) Appl. No.: 15/114,859

(22) PCT Filed: Jan. 28, 2014

(86) PCT No.: PCT/IB2014/058592
§ 371 (c)(1),
(2) Date: Jul. 28, 2016

(87) PCT Pub. No.: WO2015/114403
PCT Pub. Date: Aug. 6, 2015

(65) Prior Publication Data
US 2017/0002730 A1 Jan. 5, 2017

(51) Int. Cl.
*F02B 53/02* (2006.01)
*F01C 1/20* (2006.01)
*F02B 55/14* (2006.01)

(52) U.S. Cl.
CPC ............ *F02B 53/02* (2013.01); *F01C 1/20* (2013.01); *F02B 55/14* (2013.01)

(58) Field of Classification Search
CPC .......... F02B 55/14; F02B 53/02; F01C 1/123; F01C 1/20; F01C 21/08; F01C 19/02; F04C 127/001; F04C 127/22306; F04C 2250/20; F04C 2230/60; Y10T 29/49229; Y10T 29/49336

USPC ..... 123/205; 418/1, 112–113, 123, 191, 196
See application file for complete search history.

(56) References Cited

U.S. PATENT DOCUMENTS

| 182,503 | A | * | 9/1876 | Wilbraham | ............ F04C 2/3443 |
| | | | | | 418/127 |
| 274,478 | A | * | 3/1883 | Forbes | ...................... F01C 1/20 |
| | | | | | 418/105 |
| 321,254 | A | * | 6/1885 | Sewrey | ................... F01C 19/04 |
| | | | | | 418/122 |
| 525,121 | A | * | 8/1894 | Shepard | ..................... F01C 1/20 |
| | | | | | 415/152.1 |

(Continued)

FOREIGN PATENT DOCUMENTS

| CH | 647 843 A5 | 2/1985 |
| CH | 647843 A5 * | 2/1985 | ............... F01C 1/20 |

(Continued)

*Primary Examiner* — Jason Newton
(74) *Attorney, Agent, or Firm* — John Alumit

(57) ABSTRACT

A none-compression internal combustion rotor motor and method to eliminate all of the disadvantages of the presently available internal combustion engines. By eliminating the compression stroke, increasing the efficiency. By replacing the crank shaft, the valve train and the cast iron parts with the main rotor, the combustion pressure can be converted into much higher rotational power and torque and efficiency. By having less parts, and by manufacturing from aluminum, eliminating all of the cast iron parts, reducing the manufacturing energy consumption. By having only balanced rotating parts that rotate on bearings without touching each other, greatly increasing the lifetime of the motor. The none-compression internal combustion rotor motor is air cooled needing no coolant, making it environmentally friendly.

2 Claims, 3 Drawing Sheets

(56) References Cited

U.S. PATENT DOCUMENTS

| | | | | |
|---|---|---|---|---|
| 562,405 | A * | 6/1896 | Kryszat | F04C 2/14 418/196 |
| 597,793 | A * | 1/1898 | Taylor | F04C 2/3562 418/139 |
| 660,017 | A * | 10/1900 | Lambert | B24B 55/00 418/196 |
| 669,000 | A * | 2/1901 | Peck, Jr. | F04C 2/14 418/196 |
| 759,779 | A * | 5/1904 | Wade et al. | F01C 19/04 418/112 |
| 813,854 | A * | 2/1906 | Burlich | F04C 2/14 418/196 |
| 878,327 | A * | 2/1908 | Adams | F04C 2/3446 418/113 |
| 904,749 | A * | 11/1908 | Bender | F04C 2/101 418/196 |
| 976,539 | A * | 11/1910 | Bender | F04C 2/3446 418/186 |
| 980,075 | A * | 12/1910 | Doke | F04C 2/14 418/196 |
| 995,505 | A * | 6/1911 | Weddington | F04C 2/3446 418/186 |
| 1,017,139 | A * | 2/1912 | Cummins | F04C 15/0042 418/196 |
| 1,019,223 | A * | 3/1912 | Christoffersen | F01C 19/10 418/117 |
| 1,106,882 | A * | 8/1914 | Mathiesen | F01C 19/04 418/122 |
| 1,193,808 | A * | 8/1916 | McCarthy | F02B 53/00 123/232 |
| 1,226,745 | A * | 5/1917 | Brooks | F02B 53/00 123/210 |
| 1,238,467 | A * | 8/1917 | Wherry | F04C 2/14 418/196 |
| 1,268,771 | A * | 6/1918 | Randolph | F01C 1/20 418/105 |
| 1,268,794 | A * | 6/1918 | Harris et al. | F02B 53/00 123/249 |
| 1,269,735 | A * | 6/1918 | Ogden | F01C 1/3562 418/187 |
| 1,283,614 | A * | 11/1918 | Alvey | B06B 1/162 418/196 |
| 1,294,771 | A * | 2/1919 | Conklin | F02B 53/00 123/232 |
| 1,387,949 | A * | 8/1921 | Smith | F01C 1/20 418/186 |
| 1,395,114 | A * | 10/1921 | Jackman | F04C 2/36 418/186 |
| 1,446,079 | A * | 2/1923 | Wood | F02B 53/00 123/232 |
| 1,766,519 | A * | 6/1930 | Johnson | F01C 1/20 418/196 |
| 2,062,753 | A * | 12/1936 | Linn | F02B 53/00 123/238 |
| 2,070,631 | A * | 2/1937 | Sunderland | F02B 53/00 123/229 |
| 2,130,054 | A * | 9/1938 | Whitfield | F04C 18/20 418/183 |
| 2,152,564 | A * | 3/1939 | Perkins | F01C 1/20 418/196 |
| 2,275,205 | A * | 3/1942 | Straub | F02B 53/00 123/206 |
| 2,863,425 | A * | 12/1958 | Breelle | F01C 1/20 123/212 |
| 2,920,814 | A * | 1/1960 | Breelle | F01C 1/20 123/209 |
| 2,927,560 | A * | 3/1960 | Breelle | F01C 1/20 123/209 |
| 2,935,027 | A * | 5/1960 | Monteil | F04C 2/36 418/113 |
| 2,958,312 | A * | 11/1960 | Shimomura | F02B 53/00 418/111 |
| 2,960,039 | A * | 11/1960 | Phivretveit | F04C 2/36 418/152 |
| 3,116,666 | A * | 1/1964 | Scott | F02B 53/00 418/186 |
| 3,435,808 | A * | 4/1969 | Allender | F02B 53/00 123/232 |
| 3,820,513 | A * | 6/1974 | Buettner | F02B 53/00 123/222 |
| 4,086,880 | A * | 5/1978 | Bates | F01C 1/20 123/201 |
| 4,561,836 | A * | 12/1985 | Wankel | F01C 1/20 418/183 |
| 6,129,067 | A * | 10/2000 | Riley | F01C 1/20 123/232 |
| 6,132,197 | A * | 10/2000 | Adamovski | F01C 1/20 123/229 |
| 6,488,004 | B1 * | 12/2002 | Adamovski | F01C 1/086 123/232 |
| 6,932,047 | B2 * | 8/2005 | Watkins | F01C 1/36 123/241 |
| 7,201,134 | B2 * | 4/2007 | Guest | F01C 1/20 123/232 |
| RE41,373 | E * | 6/2010 | Gehman | F01C 1/20 123/232 |
| 8,109,252 | B2 * | 2/2012 | Watkins | F01C 19/02 123/205 |
| 9,664,047 | B2 * | 5/2017 | McDaniel, Jr. | F01C 1/123 |
| 9,664,048 | B2 * | 5/2017 | McDaniel, Jr. | F01C 1/123 |
| 2002/0150481 | A1 * | 10/2002 | Adamovski | F01C 1/20 417/310 |
| 2006/0150946 | A1 * | 7/2006 | Wright | F01C 1/20 123/231 |
| 2007/0119408 | A1 * | 5/2007 | Kang | F01C 1/36 123/232 |
| 2015/0308272 | A1 * | 10/2015 | Rolus Borgward | F01C 1/123 123/210 |

FOREIGN PATENT DOCUMENTS

| DE | 563 185 C | 11/1932 | | |
| GB | 139 529 A | 3/1920 | | |
| GB | 992 060 A | 5/1965 | | |
| GB | 992060 A * | 5/1965 | | F01C 1/20 |
| WO | WO2012/057838 A2 | 5/2012 | | |
| WO | WO 2012057838 A2 * | 5/2012 | | F01C 1/20 |

* cited by examiner

COMBUSTION ENGINE WITHOUT COMPRESSION AND METHOD

CROSS-REFERENCE TO RELATED APPLICATION

This application claims the benefit of the priority filing date of international application no. PCT/IB2014/058592, filed on 28 Jan. 2014, and is incorporated herein in its entirety.

BACKGROUND OF THE INVENTION

Several problems are inherent in currently used internal combustion engines. By analyzing internal combustion engine designs and methods known in the art, it becomes clear that the fuel-to-horsepower ratio falls within the range of twenty to thirty percent. This means that seventy to eighty percent of the fuel consumed by the engine is wasted and emitted as air pollution.

The primary cause of the low fuel-to-horsepower ratio is the motor's compression stroke, which is responsible for thirty percent to forty percent of the loss in efficiency. The secondary cause of lost efficiency is the up and down piston movement, which must be converted to a rotating movement with a crank shaft. That conversion is responsible for twenty-five to thirty percent of lost efficiency.

The high weight-to-horsepower ratio in piston engines is between three and four kilograms per horsepower. The primary cause of the high weight-to-horsepower ratio is the low fuel-to-horsepower ratio, which requires engines to be larger. The secondary cause of the high weight-to-horsepower ratio is that most parts of internal combustion engines are made of forged steel and cast iron.

The primary cause of high energy consumption in manufacturing internal combustion engines is the low fuel-to-horsepower ratio, which means larger engines are required to achieve higher horsepower in output. The secondary cause of high energy consumption in manufacturing internal combustion engines are the high temperatures required for manufacturing forged steel and cast iron parts. A tertiary cause of high energy consumption in manufacturing internal combustion engines is the effort involved in finishing all of the forged steel and cast iron parts.

Thus what is a needed is an internal combustion engine design and method of manufacture that addresses all of these problems, yielding a method of building highly economical non-compressive internal combustion rotor-motors. It is thus an object of the present invention to create a high fuel-to-horsepower engine by eliminating the compression stroke of the engine and the up and down piston movement. Another object of the invention is to create a low weight-to-horsepower engine by eliminating the valve train, the forged steel crank shaft and all the cast iron parts, which are required in internal combustion engines as known in the art. Yet another object of the invention is to produce a high-torque internal combustion engine by increasing the diameter of the blades. Still another object of the invention it to provide an internal combustion engine requiring low energy consumption using a simple design, fewer parts, and which is made of a light-weight material, such as aluminum.

These and other objects of the present invention are more fully discussed in the following Summary, Description and Claims.

SUMMARY

A non-compression internal combustion rotor-motor includes a main rotor portion having a central tubular main shaft and a drum that surrounds the central tubular main shaft in an axial direction. The tubular main shaft and the drum have multiple spacers multiple holes for venting exhaust gasses, and are provided with two blades arranged on the drum. The blades are adapted to rotate around the main shaft between front and rear side discs with bearings for the main rotor and several C-shaped timing rotors. Central bearings are provided for the main rotor and the timing rotors, with the bearings inserted at the edges of two or more side discs, preferably front and rear side disks.

The main rotor is inserted in the accordance with the bearings of the front and rear side disks. A main timing gear is placed on the main shaft at the front side, whereby timing gears at the front side are adapted to synchronize the rotation of the C-shaped timing rotors into a position to let the blades rotate freely but closing the space after the blade passes through. Preferably three C-shaped timing rotors are provided, and the C-shaped timing rotors are adapted to enclose the space between the combustion chamber cover and the drum of the main shaft.

By enclosing the space between the combustion chamber cover and the drum of the main shaft, enclosed combustion chambers are formed with the front and rear side discs. Preferably three combustion chamber covers are provided, with each comprising fuel injector- and sparkplug ports, wherein the ports are arranged to be covered by the C-shaped timing rotors, and the blades are designed so that there is a distance between them and the C-shaped timing rotors as they pass through the space occupied by the timing rotors.

DESCRIPTION

Figure 8:
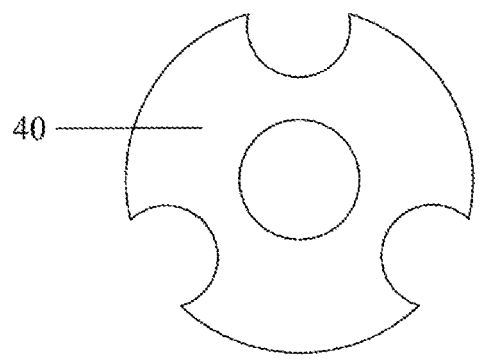
FIG. 8 illustrates a side disc of the non-compressive internal combustion rotor-motor.

The non-compressive internal combustion rotor motor and method according to the present invention comprises a plurality of side disks 40 shown in FIG. 8. The side disks 40, which may be a front disk 40 and a rear disk 40, have bearings inserted in the center for the main rotor shown in FIGS. 13 and 14, and bearings inserted in for the three timing rotors 33 (creating combustion chambers A, B, and C in FIGS. 1-6 at the edges of each side disk 40.

Figure 7:
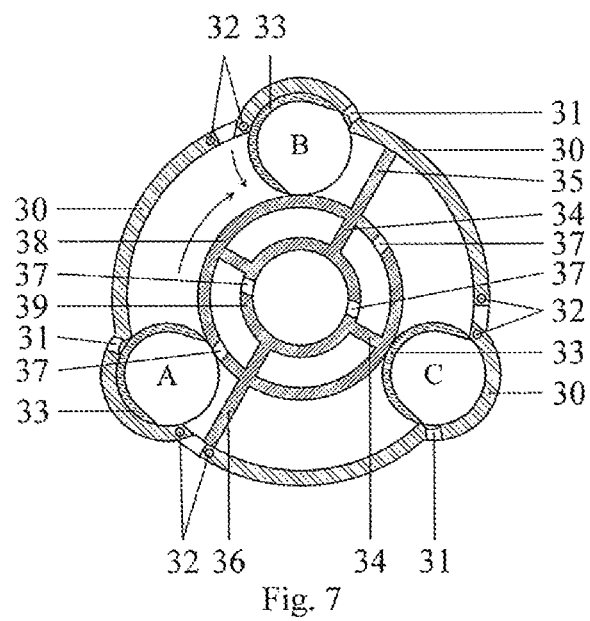
FIG. 7 illustrates the cross-section, showing the rotation of a cover drum relative to a combustion chamber.
Figure 13:
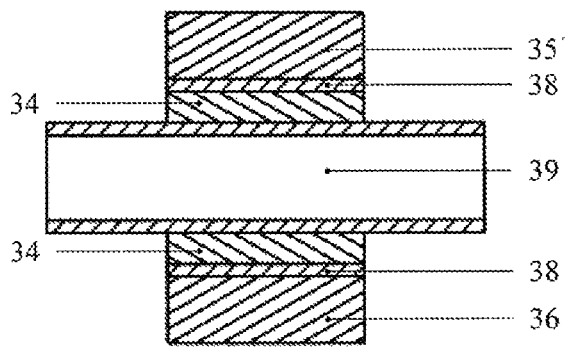
FIG. 13 illustrates a cut-away side view of a main rotor of the non-compressive internal combustion rotor-motor.
Figure 14:
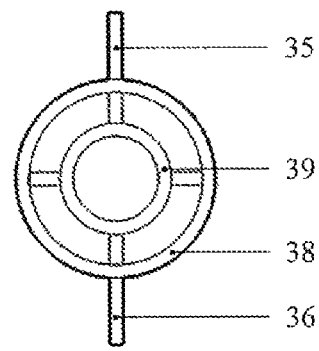
FIG. 14 illustrates a front view of the main rotor.
Figure 15:
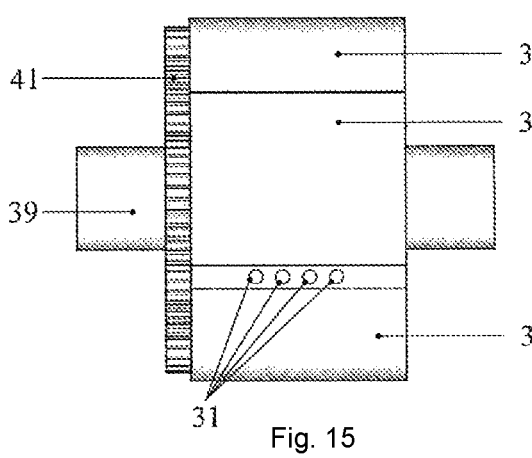
FIG. 15 illustrates a side view of the main rotor with timing gears.

The main rotor shown in FIGS. 13 and 14, and in cross-section in FIG. 7, has a tubular main shaft 39, with multiple spacers between the main shaft 39 and the drum 38, with a first blade 35, and a second blade 36, inserted into the bearings of the front disk 40 and rear disk 40. The main timing gear 41 is placed on the main shaft 39 at the front side of the main rotor as shown in FIG. 15.

Figure 9:
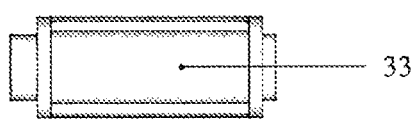
FIG. 9 illustrates a top view of a timing rotor of the non-compressive internal combustion rotor-motor.
Figure 10:
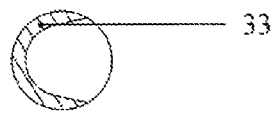
FIG. 10 illustrates a cut-away view of the timing rotor.
Figure 11:
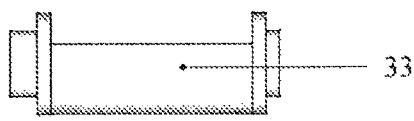
FIG. 11 illustrates a side elevation view of the timing rotor.
Figure 12:
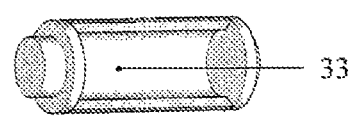
FIG. 12 illustrates a perspective view of the timing rotor.

The three timing rotors 33 are preferably "C" shaped as shown in FIG. 9 and are inserted between the front side disk 40 and the rear side disk 40. Timing gears 41 are placed on the font side FIG. 15 and FIG. 16. to synchronize the rotation of the timing rotors 33 positions allowing the blades 35 and 36, to rotate freely while enclosing the space between the combustion chamber cover 30 (FIG. 7) and the drum 38 of the main shaft, to create an enclosed combustion chamber.

Figure 16:
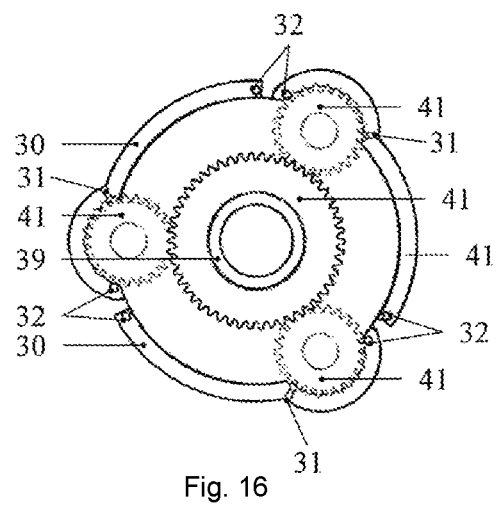
FIG. 16 illustrates a front view of the non-compressive internal combustion rotor-motor with timing gears.

In a preferred embodiment according to the present invention, the non-compressive internal combustion rotor motor has three combustion chamber covers 30 as shown in FIG. 7 containing multiple exhaust ports 32, multiple fuel injector ports 37 and spark plug ports 31. The combustion chamber covers 30 are placed on the top edges of the two side disks 40 as shown in FIG. 15 and FIG. 16 to cover the timing rotors 33, and the side disks 40 in forming each combustion chamber.

In the working method of the present invention, the non-compressive internal combustion rotor motor, in the preferred embodiment, there are has three "C" shape timing rotors 33 in positions A, B, and C as shown in FIG. 7 and FIGS. 3-6, and three combustion chamber covers 30. The direction of rotation of the timing rotors 33 are preferably counter clockwise, and the main rotor shown in FIGS. 13 and 14 has two blades 35, 36, wherein the direction of rotation of the main rotor is clockwise.

Figure 2:
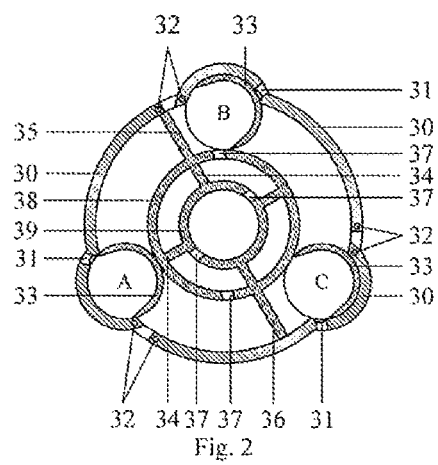
FIG. 2 illustrates the cross-section in a second position.
Figure 5:
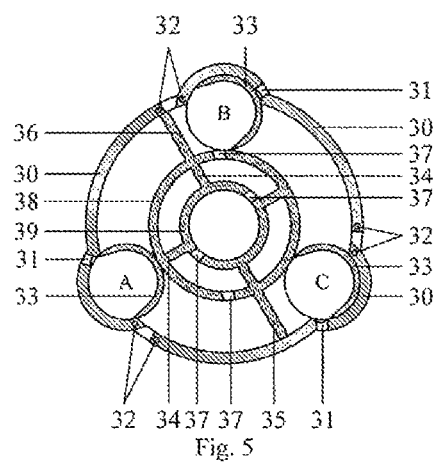
FIG. 5 illustrates the cross-section in a fifth position.

When blade 36 is in ignition position in combustion chamber A (shown in FIG. 1) the timing rotor 33 in position A encloses the space between the combustion chamber cover 30 and the main drum 38 and fuel is injected and ignited. Before blade 36 gets to the rear exhaust port 32 of combustion chamber A to let the exhaust out as shown in FIG. 2, the timing rotor 33 in the A position opens to the front exhaust port 32 of combustion chamber A with the rear edge of blade 35 in position in chamber C as shown in FIG. 2 prior to ignition.

Figure 3:
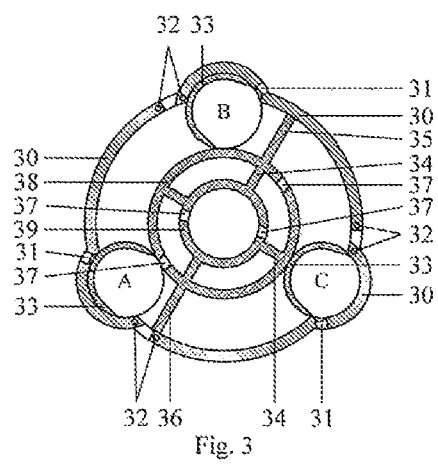
FIG. 3 illustrates the cross-section in a third position.
Figure 4:
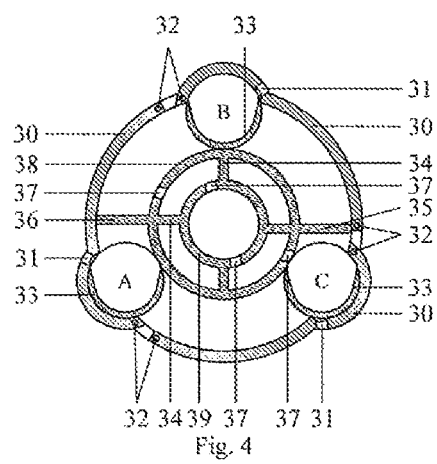
FIG. 4 illustrates the cross-section in a fourth position.
Figure 1:
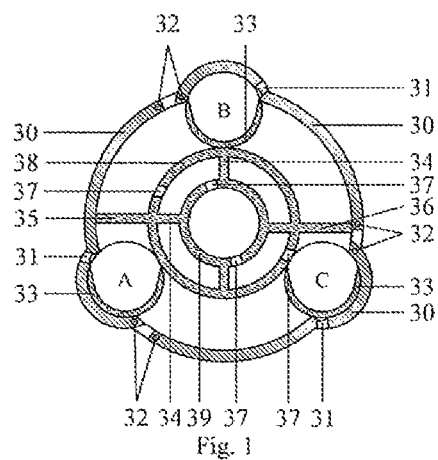
FIG. 1 illustrates a cross-section of a non-compressive internal combustion rotor-motor in a first position.
Figure 6:
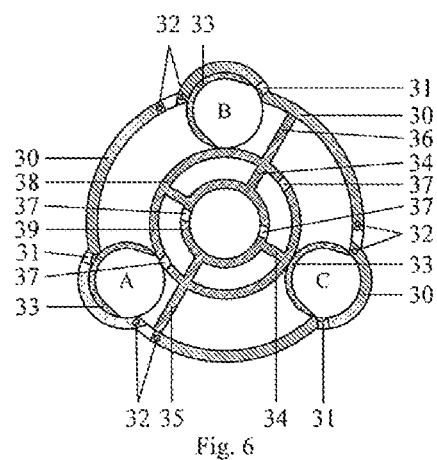
FIG. 6 illustrates the cross section in a sixth position.

Before blade 35 reaches the rear exhaust port 32 of combustion chamber C, as shown in FIG. 3, blade 36 gets into position near chamber B for ignition. Before blade 36 reaches the rear exhaust port 32 of combustion chamber B as shown in FIG. 4, blade 35 reaches a position in chamber A for ignition. Before blade 35 get to the rear exhaust port 32 of combustion chamber "A" FIG. 5, blade 36 in position in chamber "C" FIG. 5, to get ignited. Before blade 36 reaches the rear exhaust port 32 of combustion chamber C as shown in FIG. 6, blade 35 reaches the position shown in chamber A as shown in FIG. 1.

The cycle repeats itself, with six combustions per revolution, which converts the combustion pressure to pure rotational high torque turning power. Additionally, the diameter of the motor can be made in any size, the timing rotor diameter and main rotor diameter ratio can be 1-to-1, 1-to-2, 1-to-3, 1-to-4 or greater.

What I claim as my invention is:

1. A non-compressive internal combustion rotor-motor, comprising:
    a main rotor having a central tubular main shaft and a drum spaced apart from the tubular main shaft by a plurality of spacers, the drum surrounding the tubular main shaft in an axial direction;
    a plurality of holes for venting located between the tubular main shaft and the drum;
    two opposing blades arranged on the drum, configured to rotate with the tubular main shaft;
    at least three c-shaped timing rotors;
    a front side disk and a rear side disk, the front side disk and the rear side disk each comprising a plurality of bearings configured to engage respective ones of the main rotor and the at least three c-shaped timing rotors, wherein each of the plurality of bearings for the at least three c-shaped timing rotors are inserted into respective edges of the front side disk and the rear side disk, and wherein the tubular main shaft engages at least one of the plurality of bearings;
    a main timing gear affixed to the main shaft proximal the front side disk and in engagement with the at least three c-shaped timing rotors, wherein the main timing gear is configured to synchronize rotation of the at least three c-shaped timing rotors in a manner allowing the two opposing blades to pass through spaces occupied by the c-shaped timing rotors as the two opposing blades rotate with the tubular main shaft;
    wherein the c-shaped timing rotors individually enclose a space between a combustion chamber cover and the drum to form a plurality of enclosed combustion chambers bounded by the front side disk and the rear side disk; and
    three combustion chamber covers, each combustion chamber cover comprising at least one fuel injector port and at least one spark plug port, the ports arranged to be temporarily coverable by each of the at least three c-shaped timing rotors, and
    wherein each of the two opposing blades, when passing through the space, are configured to provide a distance between each of the two opposing blades and an associated one of the at least three c-shaped timing rotors.

2. The non-compressive internal combustion rotor-motor of claim 1 wherein the main rotor and each of the c-shaped timing rotors are balanced relative to each other.

* * * * *